United States Patent
Ishii et al.

(10) Patent No.: US 11,741,353 B2
(45) Date of Patent: Aug. 29, 2023

(54) BIAS SCHEME FOR SINGLE-DEVICE SYNAPTIC ELEMENT

(71) Applicant: INTERNATIONAL BUSINESS MACHINES CORPORATION, Armonk, NY (US)

(72) Inventors: Masatoshi Ishii, Yokohama (JP); Takeo Yasuda, Nara (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 427 days.

(21) Appl. No.: 17/115,895

(22) Filed: Dec. 9, 2020

(65) Prior Publication Data

US 2022/0180165 A1 Jun. 9, 2022

(51) Int. Cl.
| | |
|---|---|
| *G06N 3/04* | (2023.01) |
| *G06N 3/06* | (2006.01) |
| *G06N 3/08* | (2023.01) |
| *G06N 3/065* | (2023.01) |

(52) U.S. Cl.
CPC .............. *G06N 3/065* (2023.01); *G06N 3/04* (2013.01); *G06N 3/08* (2013.01)

(58) Field of Classification Search
CPC ............. G06N 3/04; G06N 3/065; G06N 3/08
See application file for complete search history.

(56) References Cited

U.S. PATENT DOCUMENTS

| | | |
|---|---|---|
| 10,242,737 B1 | 3/2019 | Lin et al. |
| 10,572,799 B2 | 2/2020 | Hosokawa et al. |
| 10,671,911 B2 | 6/2020 | Ritter et al. |
| 2013/0046716 A1 | 2/2013 | Chan et al. |

(Continued)

FOREIGN PATENT DOCUMENTS

| | | |
|---|---|---|
| CN | 109784482 A | 5/2019 |
| CN | 110192207 A | 8/2019 |
| CN | 110378475 A | 10/2019 |

OTHER PUBLICATIONS

Paliy, Maksym, et al. "Analog vector-matrix multiplier based on programmable current mirrors for neural network integrated circuits." IEEE Access 8 (2020): 203525-203537. (Year: 2020).*

(Continued)

*Primary Examiner* — Hal Schnee
(74) *Attorney, Agent, or Firm* — Tutunjian & Bitetto, P.C.; Randy Emilio Tejeda

(57) ABSTRACT

A neuromorphic synapse array includes a plurality of synaptic array cells being connected by circuitry such that the synaptic array cells are assigned to rows and columns of an array, the synaptic array cells respectively having a single polarity synapse weight, the rows respectively connected to respective input ends of the synaptic array cells, the columns respectively connected to respective output ends of the synaptic array cells, the synaptic array cells aligned in a column of the array being defined as operation column arrays and an array of current mirrors, each current mirror exhibiting a mirror ratio of N:1, wherein N is a number of columns of the synaptic array cells, respectively connected to the respective rows such that weights corresponding to all of the current mirrors are set to average weights of all of the synaptic array cells that are updated during a learning phase.

25 Claims, 12 Drawing Sheets

(56) References Cited

U.S. PATENT DOCUMENTS

| | | | |
|---|---|---|---|
| 2016/0371583 | A1 | 12/2016 | Hosokawa et al. |
| 2017/0110187 | A1 | 4/2017 | Whitaker |
| 2017/0185890 | A1 | 6/2017 | Yasuda et al. |
| 2018/0197074 | A1 | 7/2018 | Friedman et al. |
| 2019/0164044 | A1 | 5/2019 | Song et al. |
| 2019/0171933 | A1* | 6/2019 | Lee .................. G06N 3/065 |
| 2019/0354845 | A1 | 11/2019 | Yasuda et al. |
| 2019/0392881 | A1 | 12/2019 | Rakshit et al. |
| 2020/0020393 | A1 | 1/2020 | Al-Shamma |
| 2020/0145008 | A1* | 5/2020 | Strukov ............. G11C 16/0425 |
| 2020/0202206 | A1 | 6/2020 | Rummens et al. |
| 2020/0218963 | A1 | 7/2020 | Yasuda et al. |
| 2020/0258942 | A1 | 8/2020 | Leobandung |

OTHER PUBLICATIONS

Yu, Shengqi, et al. "Current-mode carry-free multiplier design using a memristor-transistor crossbar architecture." 2020 Design, Automation & Test in Europe Conference & Exhibition (Date). IEEE, 2020. (Year: 2020).*

Gokmen, Tayfun, et al. "Acceleration of deep neural network training with resistive cross-point devices: design considerations," Frontiers in neuroscience, Jul. 2016, 19 pp. 10, 333.

Zhang, Yang, et al. "Memristor-based circuit design for multilayer neural networks," IEEE Transactions on Circuits and Systems I: Regular Papers, Feb. 2018, pp. 677-686, 65, 2.

Burr, G.W., et al. "Large-scale neural networks implemented with non-volatile memory as the synaptic weight element Comparative performance analysis (accuracy, speed, and power)," Electron Devices Meeting (IEDM), 2015 EEE International, IEEE, Dec. 2015, 3 pages.

Lim, Suhwan, et al. "Adaptive learning rule for hardware-based deep neural networks using electronic synapse devices," Neural Computing and Applications, 2017, pp. 1-31.

Andrews, Burton Howell, "Methods of modulation," Doctoral dissertation, Dudley Knox Library, https://core.ac.uk/download/pdf/36724361.pdf, 1948, 94 pages.

Jiang, Hao, et al., "Pulse-width modulation based dot-product engine for neuromorphic computing system using memristor crossbar array," 2018 IEEE International Symposium on Circuits and Systems (ISCAS). IEEE, May 2018, pp. 1-4.

U.S. Office Action issued in U.S. Appl. No. 16/241,530 dated Apr. 1, 2021, 48 pages.

Truong, Son Ngoc, et al. "New Memristor-Based Crossbar Array Architecture with 50-% Area Reduction and 48-% Power Saving for Matrix Vector Multiplication of Analog Neuromorphic Computing", Journal of Semiconductor Technology and Science, vol. 14, No. 3. Jun. 2014, pp. 356-363.

US Notice of Allowance issued in U.S. Appl. No. 16/241,530 dated Aug. 11, 2021, pp. 1-10.

International Search Report issued in corresponding PCT Application No. PCT/CN2021/131210 dated Feb. 10, 2022, 4 pgs.

Written Opinion issued in corresponding PCT Application No. PCT/CN2021/131210 dated Feb. 10, 2022, 4 pgs.

Miriyala et al., "Ultra-low power on-chip learning of speech commands with phase-change memories", arXiv:2010.11741v1 [eess. AS], Oct. 21, 2020, pp. 1-11.

Nomura et al., "Analysis of Effect of Weight Variation on SNN Chip with PCM-Refresh Method", Neural Processing Letters, Oct. 26, 2019, pp. 1741-1751.

Ambrogio et al., "Equivalent-accuracy accelerated neuralnetwork training using analogue memory", Nature. vol. 558. Jun. 7, 2018. pp. 60-81.

Burr et al., "Experimental demonstration and tolerancing of a large-scale neural network (165,000 synapses), using phase-change memory as the synaptic weight element", IEEE Transactions on Electron Devices. International Electron Devices Meeting (IEDM14) vol. 62, No. 11. Jul. 7, 2015. pp. 697-700.

Burr et al., "Neuromorphic computing using non-volatile memory", Advances in Physics:X 2016. vol. 2, No. 1 Dec. 5, 2016. https://www.tandfonline.com/doi/full/10.1080/23746149.2016.1259585. pp. 89-124.

Mell et al., "The NIST Definition of Cloud Computing", National Institute of Standards and Technology, Special Publication 800-145, Sep. 2011, pp. 1-7.

Xiao et al., "Analog architectures for neural network acceleration based on non-volatile memory", Appl. Phys. Rev. 7. vol. 031301; doi: 10.1063/1.5143815. Jul. 9, 2020. pp. 1-34.

List of IBM Patents or Patent Applications Treated as Related dated Dec. 9, 2020, 2 pages.

* cited by examiner

BIAS SCHEME FOR SINGLE-DEVICE SYNAPTIC ELEMENT

RELATED APPLICATION INFORMATION

This application is related to the subject matter of commonly assigned, U.S. application Ser. No. 16/241,530 filed Jan. 7, 2019, which published as US 2020/0218963.

BACKGROUND

The present invention relates generally to neuromorphic and synaptronic computation, and more specifically, to a bias scheme for a single-device synaptic element.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are functionally equivalent to neurons of a biological brain. Neuromorphic and synaptronic computation can include various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of individual experiences is stored in conductance of the synapses. The synaptic conductance changes with time as a function of the relative spike times of pre-synaptic and post-synaptic neurons, as per spike-timing dependent plasticity (STDP).

Deep neural networks (DNNs) are a family of neuromorphic computing architectures that have made substantial advances in difficult machine-learning problems such as image or object recognition, speech recognition and machine language translation. Computation for DNNs includes both training, during which the weights of the network are optimized on a training dataset, and forward inference, during which the already-learned network is used for classification, prediction or other useful tasks on new, previously unseen test data. These networks are highly amenable to computation via large and dense matrix-matrix multiplications that can be highly parallelized.

Conventional von Neumann hardware is constrained by the time and energy spent moving data back and forth between the memory and the processor (the 'von Neumann bottleneck'). By contrast, in a non-von Neumann scheme, computing is done at the location of the data, with the strengths of the synaptic connections (weights) stored and adjusted directly in memory. However, for efficient on-chip training, it would be preferable to replace the digital synaptic weights, which are stored in static random access memory arrays, with high-density analog devices that encode synaptic weight directly in their conductances. Such analog systems could achieve substantial speedup and power reduction for both forward inference and training. Desirable characteristics of analog devices for training include rapid, low-power programming of multiple analog levels, dimensional scalability, reasonable retention, high endurance and, most importantly, gradual and symmetric conductance-update characteristics.

So far, experimental demonstrations of analog memory-based DNN training have suffered from reduced classification accuracies owing to the substantial non-idealities exhibited by existing devices. These demonstrations have featured filamentary resistive RAM (RRAM), non-filamentary resistive RAM, phase change memory (PCM), conductive-bridging RAM (CBRAM), ferroelectric RAM and hybrid digital-non-volatile memory (NVM) architectures. New approaches are thus necessary to use a synaptic weight as a single device.

SUMMARY

In accordance with an embodiment, a neuromorphic synapse array is provided. The neuromorphic synapse array includes a plurality of synaptic array cells being connected by circuitry such that the synaptic array cells are assigned to rows and columns of an array, the synaptic array cells respectively having a single polarity synapse weight, the rows respectively connected to respective input ends of the synaptic array cells, the columns respectively connected to respective output ends of the synaptic array cells, the synaptic array cells aligned in a column of the array being defined as operation column arrays and an array of current mirrors, each current mirror exhibiting a mirror ratio of N:1, wherein N is a number of columns of the synaptic array cells, respectively connected to the respective rows such that weights corresponding to all of the current mirrors are set to average weights of all of the synaptic array cells that are updated during a learning phase.

In accordance with another embodiment, a computer-implemented method is provided. The computer-implemented method includes connecting, by circuitry, a plurality of synaptic array cells such that the synaptic array cells are assigned to rows and columns of an array, the synaptic array cells respectively having a single polarity synapse weight, the rows respectively connected to respective input ends of the synaptic array cells, the columns respectively connected to respective output ends of the synaptic array cells, the synaptic array cells aligned in a column of the array being defined as operation column arrays and connecting an array of current mirrors to the array, each current mirror exhibiting a mirror ratio of N:1, wherein N is a number of columns of the synaptic array cells, respectively connected to the respective rows such that weights corresponding to all of the current mirrors are set to average weights of all of the synaptic array cells that are updated during a learning phase.

In accordance with yet another embodiment, a neuromorphic synapse array is provided. The neuromorphic synapse array includes a plurality of synaptic array cells being connected by circuitry such that the synaptic array cells are assigned to rows and columns of an array, the synaptic array cells respectively having a single polarity synapse weight, the rows respectively connected to respective input ends of the synaptic array cells, the columns respectively connected to respective output ends of the synaptic array cells, the synaptic array cells aligned in a column of the array being defined as operation column arrays, an array of current mirrors, each current mirror exhibiting a mirror ratio of N:1, wherein N is a number of columns of the synaptic array cells, respectively connected to the respective rows such that weights corresponding to all of the current mirrors are set to average weights of all of the synaptic array cells that are updated during a learning phase, and an array of current integrators, each current integrator connected to a respective column of the array, and each current integrator including an integration capacitor to receive collected mirrored currents, copy the collected mirrored currents, and discharge the collected mirrored currents.

In accordance with yet another embodiment, a computer-implemented method is provided. The computer-implemented method includes connecting, by circuitry, a plurality of synaptic array cells such that the synaptic array cells are assigned to rows and columns of an array, the synaptic array cells respectively having a single polarity synapse weight, the rows respectively connected to respective input ends of the synaptic array cells, the columns respectively connected to respective output ends of the synaptic array cells, the synaptic array cells aligned in a column of the array being defined as operation column arrays, connecting an array of current mirrors to the array, each current mirror exhibiting a mirror ratio of N:1, wherein N is a number of columns of the synaptic array cells, respectively connected to the respective rows such that weights corresponding to all of the current mirrors are set to average weights of all of the synaptic array cells that are updated during a learning phase, and connecting an array of current integrators to the array, each current integrator connected to a respective column of the array, and each current integrator including an integration capacitor to receive collected mirrored currents, copy the collected mirrored currents, and discharge the collected mirrored currents.

In accordance with yet another embodiment, a neuromorphic synapse array is provided. The neuromorphic synapse array includes a plurality of synaptic array cells electrically connected such that the synaptic array cells are assigned to rows and columns of an array, the synaptic array cells respectively having a single polarity synapse weight, an array of current mirrors, each current mirror exhibiting a mirror ratio of N:1, wherein N is a number of columns of the synaptic array cells, respectively connected to the respective rows such that weights corresponding to all of the current mirrors are set to average weights of all of the synaptic array cells that are updated during a learning phase, and an array of current integrators, each current integrator connected to a respective column of the array, and each current integrator including an integration capacitor to receive collected mirrored currents, copy the collected mirrored currents, and discharge the collected mirrored currents to accelerate multiply-accumulate (MAC) operations in an artificial neural network accelerator chip.

In one preferred aspect, at least a portion of the plurality of synaptic array cells includes a resistive memory.

In another preferred aspect, at least a portion of the plurality of synaptic array cells includes a current integrator.

In yet another preferred aspect, the array of current mirrors includes different current mirror configurations for one or more of the rows of the array.

In yet another preferred aspect, one current mirror configuration includes two n-type field effect transistors (NFETs).

In yet another preferred aspect, one current mirror configuration includes two p-type field effect transistors (PFETs) and a single NFET.

In yet another preferred aspect, one current mirror configuration includes two NFETs and a single operational amplifier (op-amp).

In yet another preferred aspect, one current mirror configuration includes two PFETs, a single NFET, and two op-amps.

In yet another preferred aspect, the current integrator includes different configurations for one or more of the rows of the array.

In yet another preferred aspect, one current integrator configuration includes two PFETs, a single NFET, and an integration capacitor.

In yet another preferred aspect, one current integrator configuration includes two PFETs, a single NFET, an op-amp, and an integration capacitor.

In yet another preferred aspect, the integration capacitor receives collected mirrored currents, copies the collected mirrored currents, and discharges the collected mirrored currents.

In yet another preferred aspect, the neuromorphic synapse array accelerates multiply-accumulate (MAC) operations in an artificial neural network accelerator chip.

The advantages of the present invention include removing processing time overhead for programming synapse cells such that "read," "write," and "averaging" operations are not necessary. Further advantages include reduction in the circuit layout area for each operation. Another advantage includes reduction in energy consumption for each operation. Also, another advantage includes reducing or eliminating read quantization errors, average calculation errors, and write quantization errors. This results in a higher storage capacity, faster processing, and better transfer speed of the data. Further advantages include higher quality, reduced cost, clearer scope, faster performance, fewer application errors, and fewer data errors.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
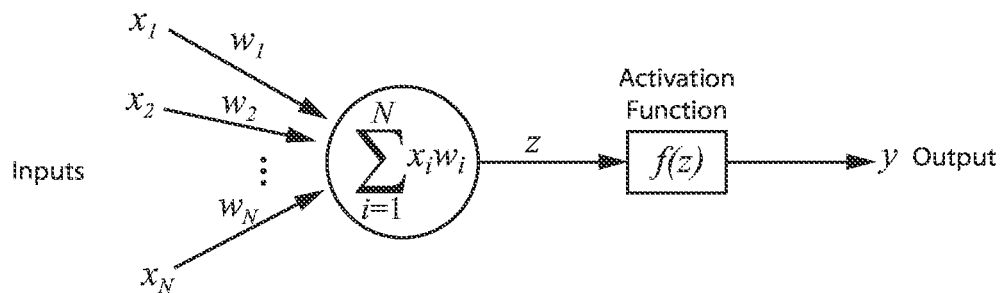
FIG. 1 shows an exemplary neuron excitation through a multiply-accumulate (MAC) operation of inputs from multiple pre-neurons by the synapses of a neuron.

Embodiments in accordance with the present invention provide methods and devices for advantageously moving an accumulated (multiply-accumulate) value in a neuron to near-zero values where activation functions have the most sensitive region by employing current mirror circuits instead of physical reference cells. Thus, each single device advantageously represents one synaptic weight.

Recently, deep learning has revolutionized the field of machine learning by providing human-like performance in areas, such as computer vision, speech recognition, and complex strategic games. However, current hardware implementations of deep neural networks are still far from competing with biological neural systems in terms of real-time information-processing capabilities with comparable energy consumption. Most neural networks are implemented on computing systems based on the von Neumann architecture with separate memory and processing units or devices. The devices store information in their resistance/conductance states and exhibit conductivity modulation based on the programming history. The central idea in building cognitive hardware-based devices is to store the synaptic weights as their conductance states and to perform the associated computational tasks in place. The two essential synaptic attributes that need to be emulated by such devices are the synaptic efficacy and plasticity. Synaptic efficacy refers to the generation of a synaptic output based on the incoming neuronal activation. Synaptic plasticity, in contrast, is the ability of the synapse to change its weight, usually during the execution of a learning algorithm. An increase in the synaptic weight is referred to as potentiation and a decrease as depression. In an ANN, the weights are usually changed based on the backpropagation algorithm.

In computing, the multiply-accumulate operation is a task that computes the product of two numbers and adds that product to an accumulator. The hardware unit that performs the operation is known as a multiplier-accumulator (MAC, or MAC unit). The operation itself is often called a MAC or a MAC operation. The MAC technique using resistive devices, such as resistive random access memory (RRAM), phase change memory (PCM), and magnetic random access memory (MRAM) is gaining interest for neural network accelerator chips. A differential sensing scheme using a pair of positive $(G)^+$ and negative $(G)^-$ resistive devices is a widely used technique for expressing a signed synaptic weight. However, instead of using a pair of $G^+$ and $G^-$ resistive devices, a synaptic weight using a single device with a reference cell was previously employed. The exemplary embodiments of the present invention advantageously employ current mirrors instead of reference cells to represent a synaptic weight. Embodiments in accordance with the present invention provide methods and devices for advantageously easing complicated programming (write) procedures by minimizing or eliminating read quantization errors, average calculation errors, and programming (write) quantization errors. The performance overhead and energy consumption is advantageously minimized, and additional layout areas for certain circuit blocks can be advantageously removed.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 shows an exemplary neuron excitation through a multiply-accumulate operation (MAC) of inputs from multiple pre-neurons by the synapses of a neuron. The multiply-accumulate operation (MAC) can be called "the product-sum." The neuromorphic array harnesses the MAC operation of biological neuron activation potential model. Neuron membrane potential, dubbed "neuron action potential" is calculated with the addition of multiplied results (product-sum) of input values and weights of synapses which are connected between the input ports and the neuron.

Figure 2:
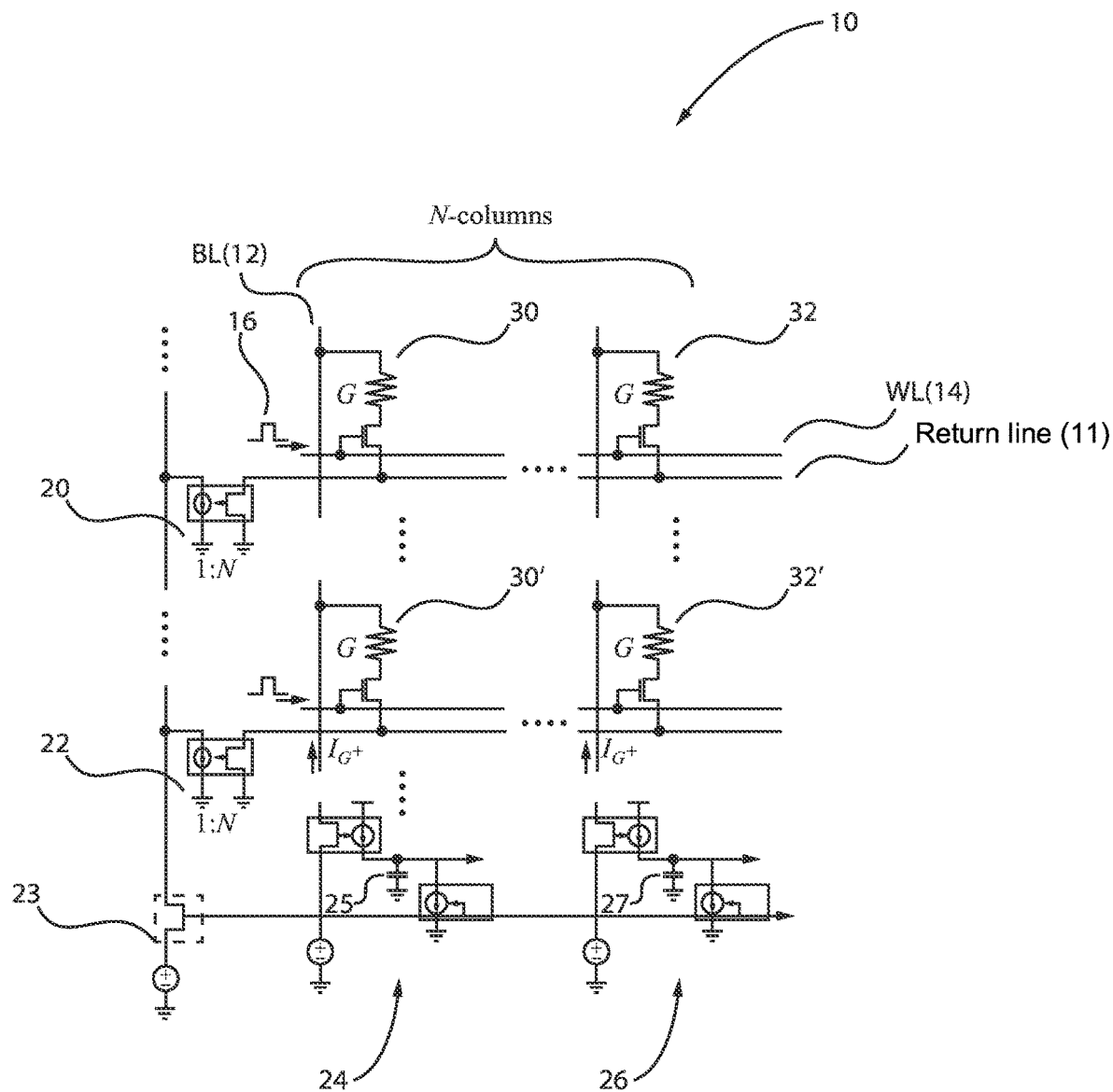
FIG. 2 is a synaptic array cell including a current mirror at each row, in accordance with an embodiment of the present invention.

FIG. 2 is a synaptic array cell including a current mirror at each row, in accordance with an embodiment of the present invention.

The synaptic array cell 10 includes a bitline 12 and a plurality of wordlines 14, as well as a plurality of return lines 11 for gathering current from each cell element in a row. The first row includes a plurality of resistive memory elements. For illustrative purposes, a first resistive memory 30 and a second resistive memory 32 are depicted. A current mirror 20 is advantageously provided for the first row. The current mirror 20 is connected in series with the first and second resistive memories 30, 32. An input pulse 16 is applied to the first row of resistive memory elements.

The second row also includes a plurality of resistive memory elements. For illustrative purposes, a first resistive memory 30' and a second resistive memory 32' are depicted for the second row. A current mirror 22 is advantageously provided for the second row. The current mirror 22 is connected in series with the first and second resistive memories 30', 32'. An input pulse is applied to the second row of resistive memory elements. Element 23 is a leg of a current mirror for sensing current. Each current mirror 20, 22 has two legs, one for sensing reference current and one for copying the currents by amplifying such as 1/N. Additionally, multiple paired legs 24, 26 are shown at each column N of the array 10, each including an integration capacitor 25, 27.

The current mirror 20, 22 is a circuit designed to copy a current through one active device by controlling the current in another active device of a circuit, keeping the output current constant regardless of loading. The current being "copied" can be, and sometimes is, a varying signal current. Stated differently, a current mirror is a circuit block which functions to produce a copy of the current flowing into or out of an input terminal by replicating the current in an output terminal. An advantageous feature of the current mirror is a relatively high output resistance which helps to keep the output current constant regardless of load conditions. Another advantageous feature of the current mirror is a relatively low input resistance which helps to keep the input current constant regardless of drive conditions.

Conceptually, an ideal current mirror is simply an ideal inverting current amplifier that reverses the current direction as well or it can include a current-controlled current source (CCCS). The current mirror 20, 22 can be advantageous used to provide bias currents and active loads to circuits. The current mirror 20, 22 can also be advantageous used to model a more realistic current source. There are certain main specifications that characterize a current mirror. One is the transfer ratio (in the case of a current amplifier) or the output current magnitude (in the case of a constant current source CCS). Another is its AC output resistance, which determines how much the output current varies with the voltage applied to the mirror. Yet another specification is the minimum voltage drop across the output part of the mirror necessary to make it work properly. This minimum voltage is dictated by the need to keep the output transistor of the mirror in active mode. The range of voltages where the mirror works is called the compliance range and the voltage marking the boundary between good and bad behavior is called the compliance voltage.

Figure 3:
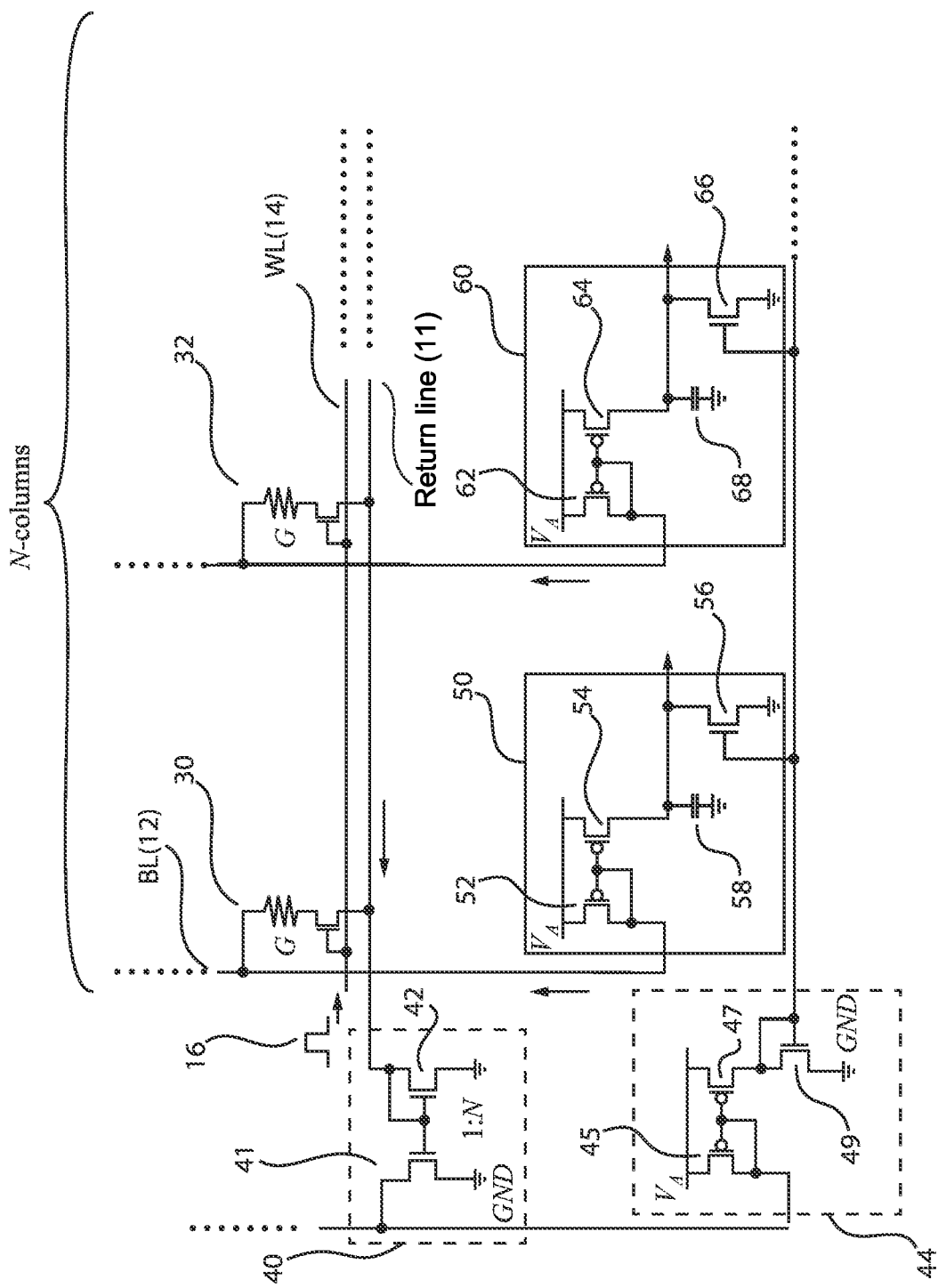
FIG. 3 is another embodiment of a synaptic array cell including a current mirror at each row, where the current mirrors include a combination of transistors, in accordance with an embodiment of the present invention.

FIG. 3 is another embodiment of a synaptic array cell including a current mirror at each row, where the current mirrors include a combination of transistors, in accordance with an embodiment of the present invention.

The synaptic array cell includes a bitline 12 and a plurality of wordlines 14, as well as a plurality of return lines 11 for gathering current from each cell element in a row. The first row includes a plurality of resistive memory elements. For illustrative purposes, a first resistive memory 30 and a second resistive memory 32 are depicted. A current mirror 40 is advantageously provided for the first row. The current mirror 40 is connected in series with the first and second resistive memories 30, 32. An input pulse 16 is applied to the first row of resistive memory elements.

The current mirror 40 includes two n-type field effect transistors (NFETs) 41, 42.

The second row includes a plurality of current integrators. For illustrative purposes, a first current integrator 50 and a second integrator 60 are depicted. A current mirror 44 is advantageously provided for the second row. The current mirror 44 is connected in series with the first and second current integrators 50, 60.

The current mirror 44 includes two p-type field effect transistors (PFETs) 45, 47 and a single NFET 49.

If the input pulse 16 comes into the array, current flows from left leg of element 50 and element 60, through resistive memories 30, 32, to the right leg of element 40. Then the current is mirrored into the left leg of element 40 with 1/N amplified. These behaviors advantageously occur in each row and column. The mirrored currents are collected at the left-most line and the collected currents are sourced from the left leg of element 44. After that, the collected currents are also mirrored into the right leg of element 44, and then advantageously copied and discharged from the integration capacitor 58, 68 of each column N. As a result, a current mirror 40, 44 is provided whose mirror ratio is N:1 at each row, where N is a number of columns for operation-synapse cells. The mirror currents are advantageously summed up together and mirrored to an integration capacitor 58, 68 on each column to shift the MAC result, without the need for a reference-synapse cell.

The elements 50, 60 are current integrators including two current mirrors and one integration capacitor. Current integrator 50 includes two PFETs 52, 54 and a single NFET 56, as well as an integration capacitor 58. Similarly, integrator 60 includes two PFETs 62, 64 and a single NFET 66, as well as an integration capacitor 68.

The NFET current mirror has only one leg. The paired common sensing leg exists in the right leg of element 44. The elements 50, 60 can also be referred to as "neuron circuits." The voltage on the integration capacitor 58, 68 is usually converted to digital bits by an analog-digital converter (ADC) so that the connected system can use the output data as digital data.

Figure 4:
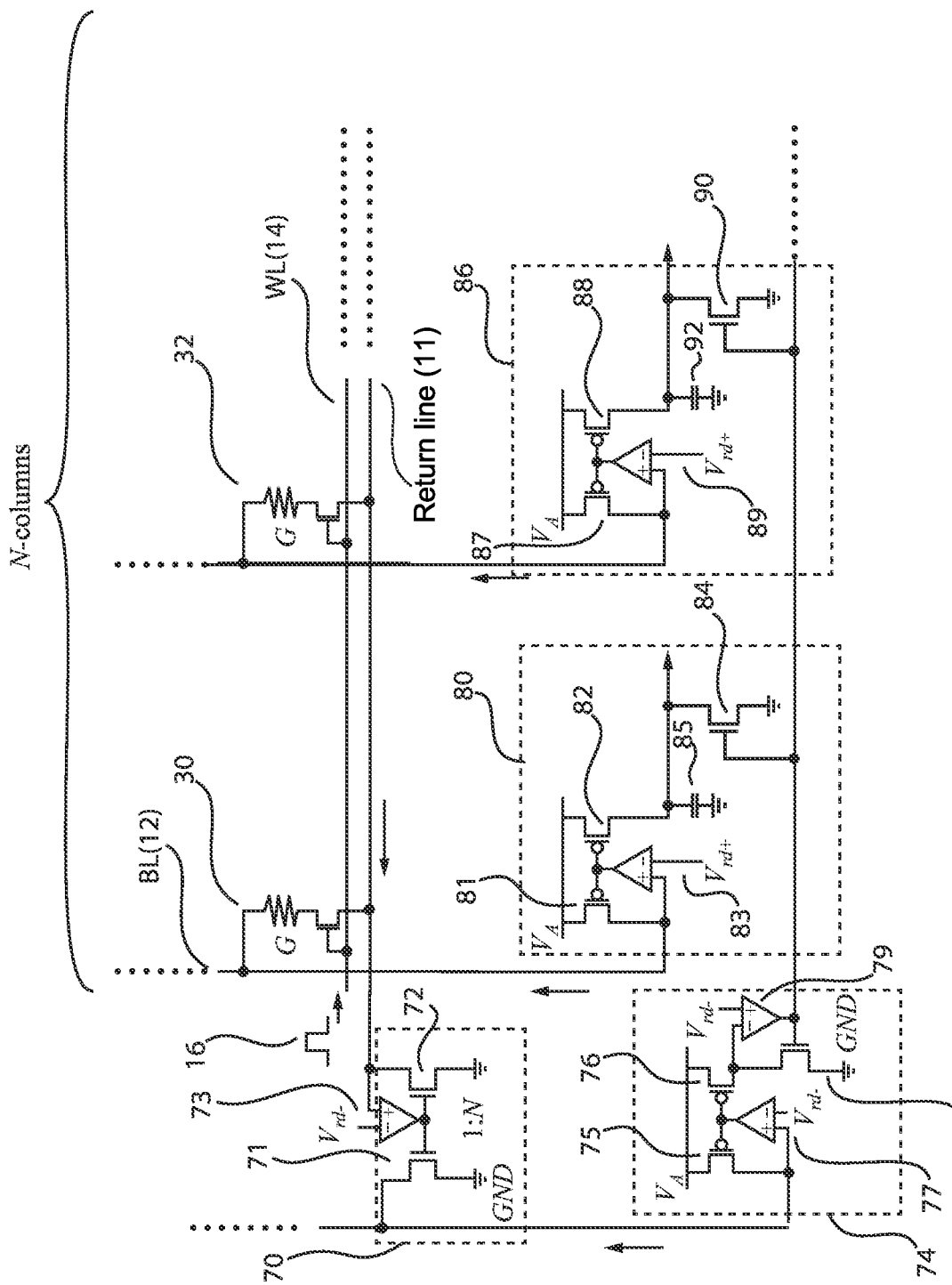
FIG. 4 is another embodiment of a synaptic array cell including a current mirror at each row, where the current mirrors include a combination of transistors and operational amplifiers, in accordance with an embodiment of the present invention.

FIG. 4 is another embodiment of a synaptic array cell including a current mirror at each row, where the current mirrors include a combination of transistors and operational amplifiers, in accordance with an embodiment of the present invention.

The synaptic array cell includes a bitline 12 and a plurality of wordlines 14, as well as a plurality of return lines 11 for gathering current from each cell element in a row. The first row includes a plurality of resistive memory elements. For illustrative purposes, a first resistive memory 30 and a second resistive memory 32 are depicted. A current mirror 70 is advantageously provided for the first row. The current mirror 70 is connected in series with the first and second resistive memories 30, 32. An input pulse 16 is applied to the first row of resistive memory elements.

The current mirror 70 includes two n-type field effect transistors (NFETs) 71, 72 and an operation amplifier or op-amp 73.

The second row includes a plurality of current integrators. For illustrative purposes, a first current integrator 80 and a second integrator 86 are depicted. A current mirror 74 is advantageously provided for the second row. The current mirror 74 is connected in series with the first and second current integrators 80, 86.

The current mirror 74 includes two PFETs 75, 76, a single NFET 78, and two op-amps 77, 79.

If the input pulse 16 comes into the array, current flows from the left leg of element 80 and element 86, through resistive memories 30, 32, to the right leg of element 70. Then the current is advantageously mirrored into the left leg of element 70 with 1/N amplified. These behaviors advantageously occur in each row and column. The mirrored currents are collected at the left-most line and the collected currents are sourced from the left leg of element 74. After that, the collected currents are also mirrored into the right leg of element 74, and then advantageously copied and discharged from the integration capacitor 85, 92 of each column N.

The elements 80, 86 are current integrators including two current mirrors and one integration capacitor. Current integrator 80 includes two PFETs 81, 82 and a single NFET 84, as well as an integration capacitor 85. Current integrator 80 further includes an op-amp 83. Similarly, integrator 86 includes two PFETs 87, 88 and a single NFET 90, as well as an integration capacitor 92. Current integrator 86 further includes an op-amp 89.

The NFET current mirror has only one leg. The paired common sensing leg exists in the right leg of element 74. The elements 80, 86 can also be referred to as "neuron circuits." The voltage on the integration capacitor 85, 92 is usually converted to digital bits by an analog-digital converter (ADC) so that the connected system can use the output data as digital data.

Each of the circuit diagrams in FIGS. 2-4 can be advantageously implemented by an artificial intelligence (AI) accelerator chip, as illustrated below with reference to FIG. 10.

Figure 5:
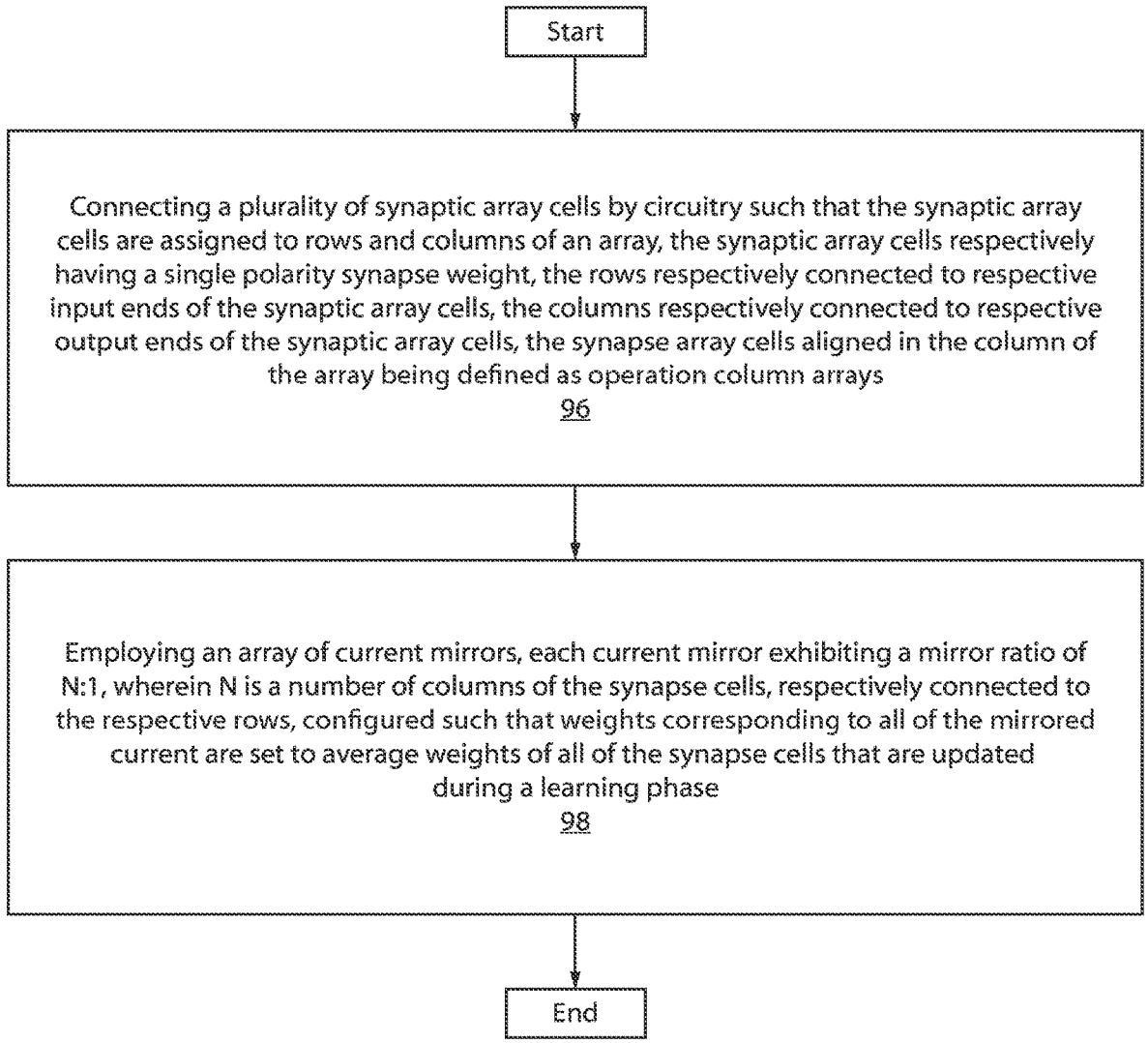
FIG. 5 is a block/flow diagram of a method for employing current mirrors for accelerating Multiply-Accumulate (MAC) operations, in accordance with an embodiment of the present invention.

FIG. 5 is a block/flow diagram of a method for advantageously employing current mirrors for accelerating Multiply-Accumulate (MAC) operations, in accordance with an embodiment of the present invention.

At block 96, connect a plurality of synaptic array cells by circuitry such that the synaptic array cells are assigned to rows and columns of an array, the synaptic array cells respectively having a single polarity synapse weight, the rows respectively connected to respective input ends of the synaptic array cells, the columns respectively connected to respective output ends of the synaptic array cells, the synapse array cells aligned in the column of the array being defined as operation column arrays.

At block 98, employ an array of current mirrors, each current mirror exhibiting a mirror ratio of N:1, wherein N is a number of columns of the synapse cells, respectively connected to the respective rows, configured such that weights corresponding to all of the mirrored current are set to average weights of all of the synapse cells that are advantageously updated during a learning phase.

Figure 6:
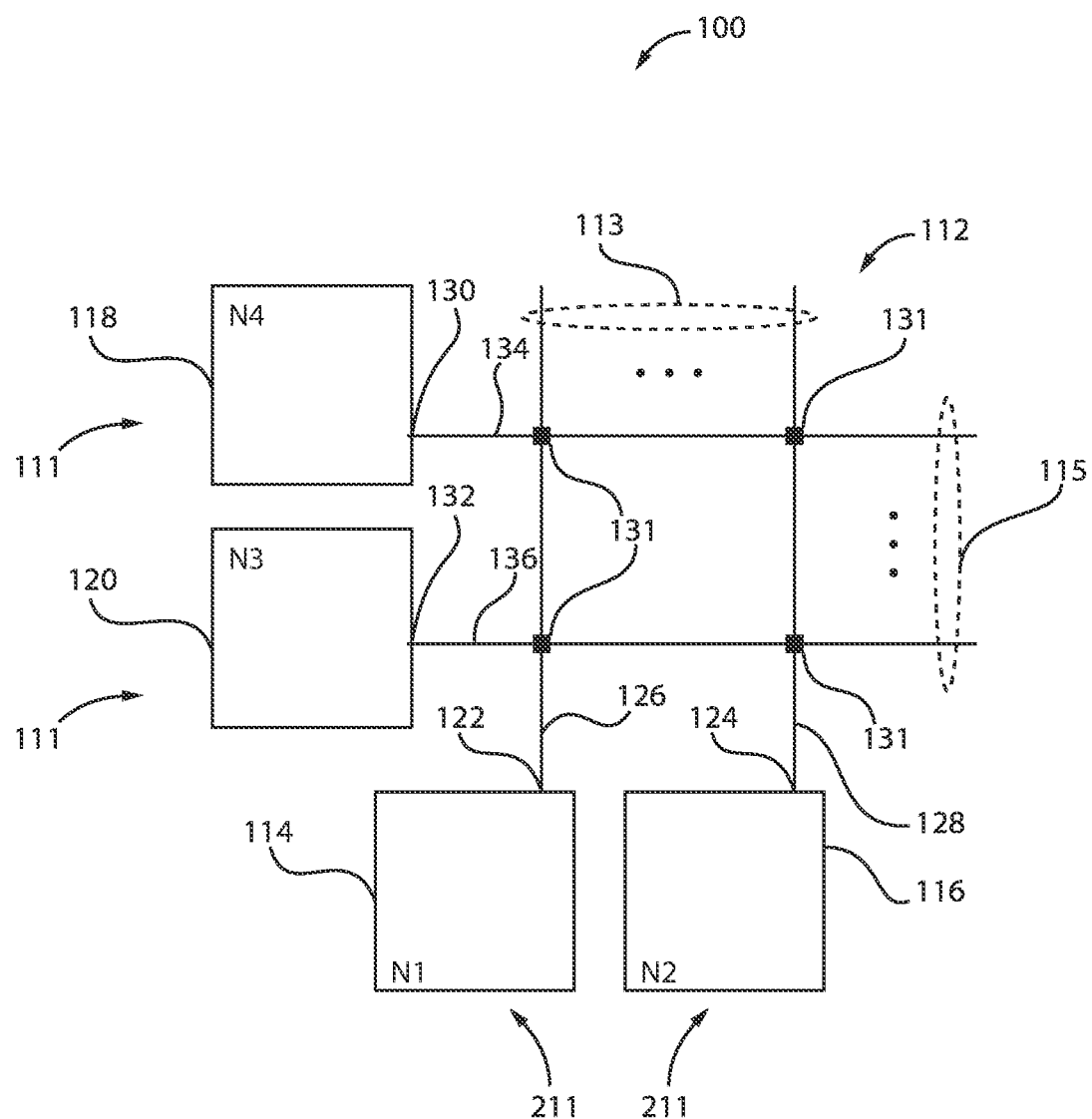
FIG. 6 is an exemplary neuromorphic and synaptronic network including a crossbar of electronic synapses interconnecting electronic neurons and axons, in accordance with an embodiment of the present invention.

FIG. 6 is an exemplary neuromorphic and synaptronic network including a crossbar of electronic synapses interconnecting electronic neurons and axons, in accordance with an embodiment of the present invention.

The example tile circuit 100 has a crossbar 112 in accordance with an embodiment of the invention. In one example, the overall circuit can include an "ultra-dense crossbar array" that can have a pitch in the range of about 10 nm to 500 nm. However, one skilled in the art can contemplate smaller and larger pitches as well. The neuromorphic and synaptronic circuit 100 includes the crossbar 112 interconnecting a plurality of digital neurons 111 including neurons 114, 116, 118 and 120. These neurons 111 are also referred to herein as "electronic neurons." For illustration purposes, the example circuit 100 provides symmetric connections between the two pairs of neurons (e.g., N1 and N3). However, embodiments of the invention are not only useful with such symmetric connection of neurons, but also useful with asymmetric connection of neurons (neurons N1 and N3 need not be connected with the same connection). The cross-bar in a tile accommodates the appropriate ratio of synapses to neurons, and, hence, need not be square.

In the example circuit 100, the neurons 111 are connected to the crossbar 112 via dendrite paths/wires (dendrites) 113 such as dendrites 126 and 128. Neurons 111 are also connected to the crossbar 112 via axon paths/wires (axons) 115 such as axons 134 and 136. Neurons 114 and 116 are dendritic neurons and neurons 118 and 120 are axonal neurons connected with axons 113. Specifically, neurons 114 and 116 are shown with outputs 122 and 124 connected to dendrites (e.g., bitlines) 126 and 128, respectively. Axonal neurons 118 and 120 are shown with outputs 130 and 132 connected to axons (e.g., wordlines or access lines) 134 and 136, respectively.

When any of the neurons 114, 116, 118 and 120 fire, they will send a pulse out to their axonal and to their dendritic connections. Each synapse provides contact between an axon of a neuron and a dendrite on another neuron and with respect to the synapse, the two neurons are respectively called pre-synaptic and post-synaptic.

Each connection between dendrites 126, 128 and axons 134, 136 are made through a digital synapse device 131 (synapse). The junctions where the synapse devices are located can be referred to herein as "cross-point junctions." In general, in accordance with an embodiment of the invention, neurons 114 and 116 will "fire" (transmit a pulse) in response to the inputs they receive from axonal input connections (not shown) exceeding a threshold.

The synapse 131 can include resistive memories 30, 32. The synapse 131 can include the current integrators 50, 60 of FIG. 3 or the current integrators 80, 86 of FIG. 4. The synapse 131 can further include any type of current mirrors described herein. Thus, one skilled in the art can contemplate all the circuit elements of FIGS. 2-4 being advantageously incorporated or embedded into the synapses 131 of the circuit 100.

Neurons 118 and 120 will "fire" (transmit a pulse) in response to the inputs they receive from external input connections (not shown), usually from other neurons, exceeding a threshold. In one embodiment, when neurons 114 and 116 fire, they maintain a postsynaptic spike-timing-dependent plasticity (STDP) (post-STDP) variable that decays. For example, in one embodiment, the decay period can be 50 μs (which is 1000× shorter than that of actual biological systems, corresponding to 1000× higher operation speed). The post-STDP variable is employed to achieve STDP by encoding the time since the last firing of the associated neuron. Such STDP is used to control long-term potentiation or "potentiation," which in this context is defined as increasing synaptic conductance. When neurons 118, 120 fire they maintain a pre-STDP (presynaptic-STDP) variable that decays in a similar fashion as that of neurons 114 and 116.

Pre-STDP and post-STDP variables can decay according to exponential, linear, polynomial, or quadratic functions, for example. In another embodiment of the invention, the variables can increase instead of decreasing over time. In any event, this variable can be used to achieve STDP by encoding the time since the last firing of the associated neuron. STDP is used to control long-term depression or "depression," which in this context is defined as decreasing synaptic conductance. Note that the roles of pre-STDP and post-STDP variables can be reversed with pre-STDP implementing potentiation and post-STDP implementing depression.

An external two-way communication environment can supply sensory inputs and consume motor outputs. Digital neurons 111 implemented using complementary metal oxide semiconductor (CMOS) logic gates receive spike inputs and integrate them. In one embodiment, the neurons 111 include comparator circuits that generate spikes when the integrated input exceeds a threshold. In one embodiment, synapses are implemented using flash memory cells, wherein each neuron 111 can be an excitatory or inhibitory neuron (or both). Each learning rule on each neuron axon and dendrite are reconfigurable as described below. This assumes a transposable access to the crossbar memory array. Neurons that spike are selected one at a time sending spike events to corresponding axons, where axons could reside on the core or somewhere else in a larger system with many cores.

The term electronic neuron as used herein represents an architecture configured to simulate a biological neuron. An electronic neuron creates connections between processing elements that are roughly functionally equivalent to neurons of a biological brain. As such, a neuromorphic and synaptronic system including electronic neurons according to embodiments of the invention can include various electronic circuits that are modeled on biological neurons, though they can operate on a faster time scale (e.g., 1000×) than their biological counterparts in many useful embodiments. Further, a neuromorphic and synaptronic system including electronic neurons according to embodiments of the invention can include various processing elements (including computer simulations) that are modeled on biological neurons. Although certain illustrative embodiments of the invention are described herein using electronic neurons including electronic circuits, the present invention is not limited to electronic circuits. A neuromorphic and synaptronic system according to embodiments of the invention can be implemented as a neuromorphic and synaptronic architecture including circuitry, and additionally as a computer simulation. Indeed, embodiments of the invention can take the form of an entirely hardware embodiment, an entirely software embodiment, or an embodiment including both hardware and software elements.

Figure 7:
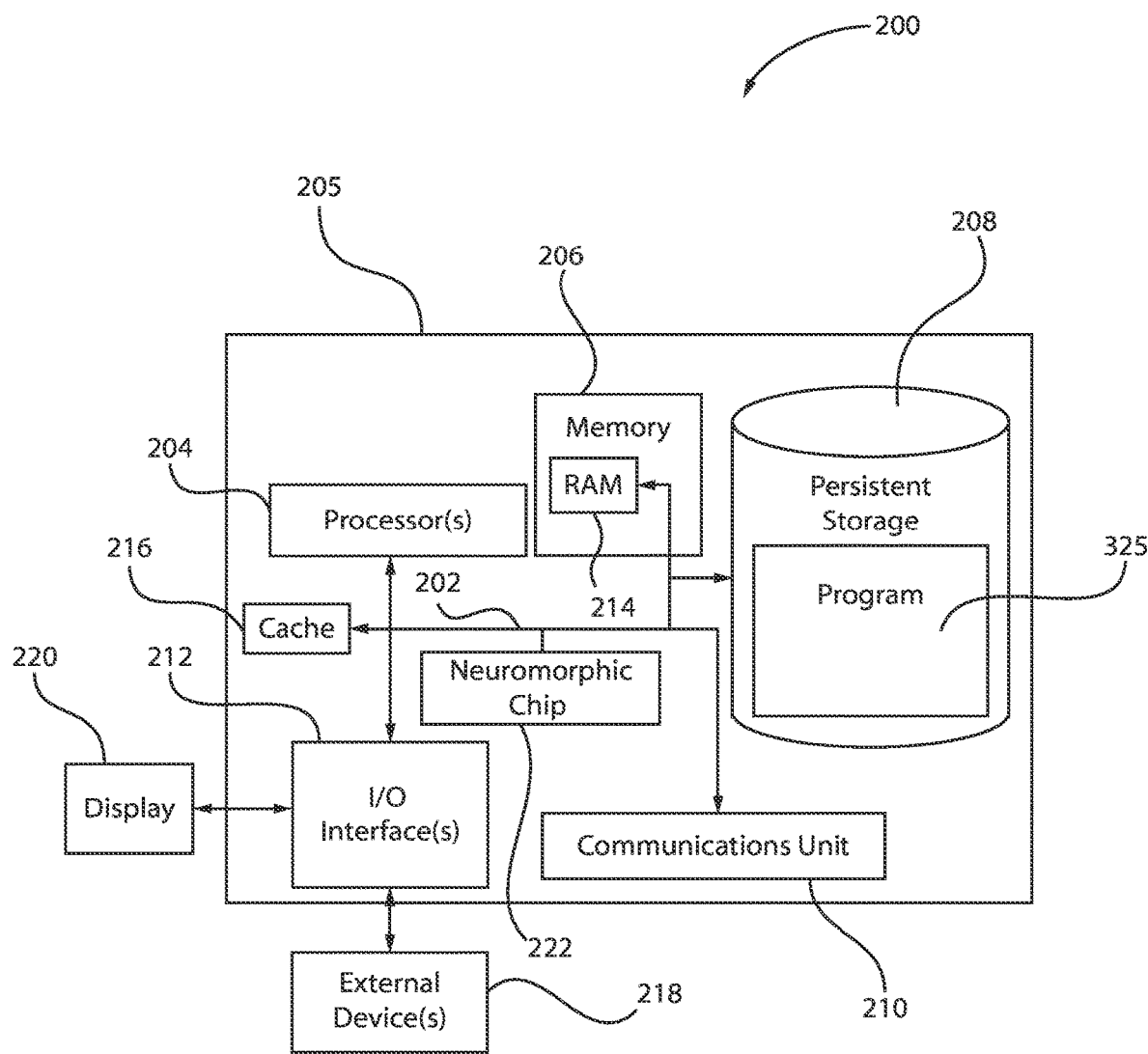
FIG. 7 is a block diagram of components of a computing system including a computing device and a neuromorphic chip capable of employing current mirrors for accelerating MAC operations, in accordance with an embodiment of the present invention.

FIG. 7 is a block diagram of components of a computing system including a computing device and a neuromorphic chip capable of employing the unit cell and/or synapse weight, in accordance with an embodiment of the present invention.

FIG. 7 depicts a block diagram of components of system 200, which includes computing device 205. It should be appreciated that FIG. 7 provides only an illustration of one implementation and does not imply any limitations with regard to the environments in which different embodiments can be implemented. Many modifications to the depicted environment can be made.

Computing device 205 includes communications fabric 202, which provides communications between computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206, cache memory 216, and persistent storage 208 are computer readable storage media. In this embodiment, memory 206 includes random access memory (RAM) 214. In another embodiment, the memory 206 can be flash memory. In general, memory 206 can include any suitable volatile or non-volatile computer readable storage media.

In some embodiments of the present invention, deep learning program 225 is included and operated by neuromorphic chip 222 as a component of computing device 205. In other embodiments, deep learning program 225 is stored in persistent storage 208 for execution by neuromorphic chip 222 in conjunction with one or more of the respective computer processors 204 via one or more memories of memory 206. In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices, including resources of distributed data processing environment. In these examples, communications unit 210 includes one or more network interface cards. Communications unit 210 can provide communications through the use of either or both physical and wireless communications links. Deep learning program 225 can be downloaded to persistent storage 208 through communications unit 210.

I/O interface(s) 212 allows for input and output of data with other devices that can be connected to computing system 200. For example, I/O interface 212 can provide a connection to external devices 218 such as a keyboard, keypad, a touch screen, and/or some other suitable input device. External devices 218 can also include portable computer readable storage media such as, for example, thumb drives, portable optical or magnetic disks, and memory cards.

Display 220 provides a mechanism to display data to a user and can be, for example, a computer monitor.

Figure 8:
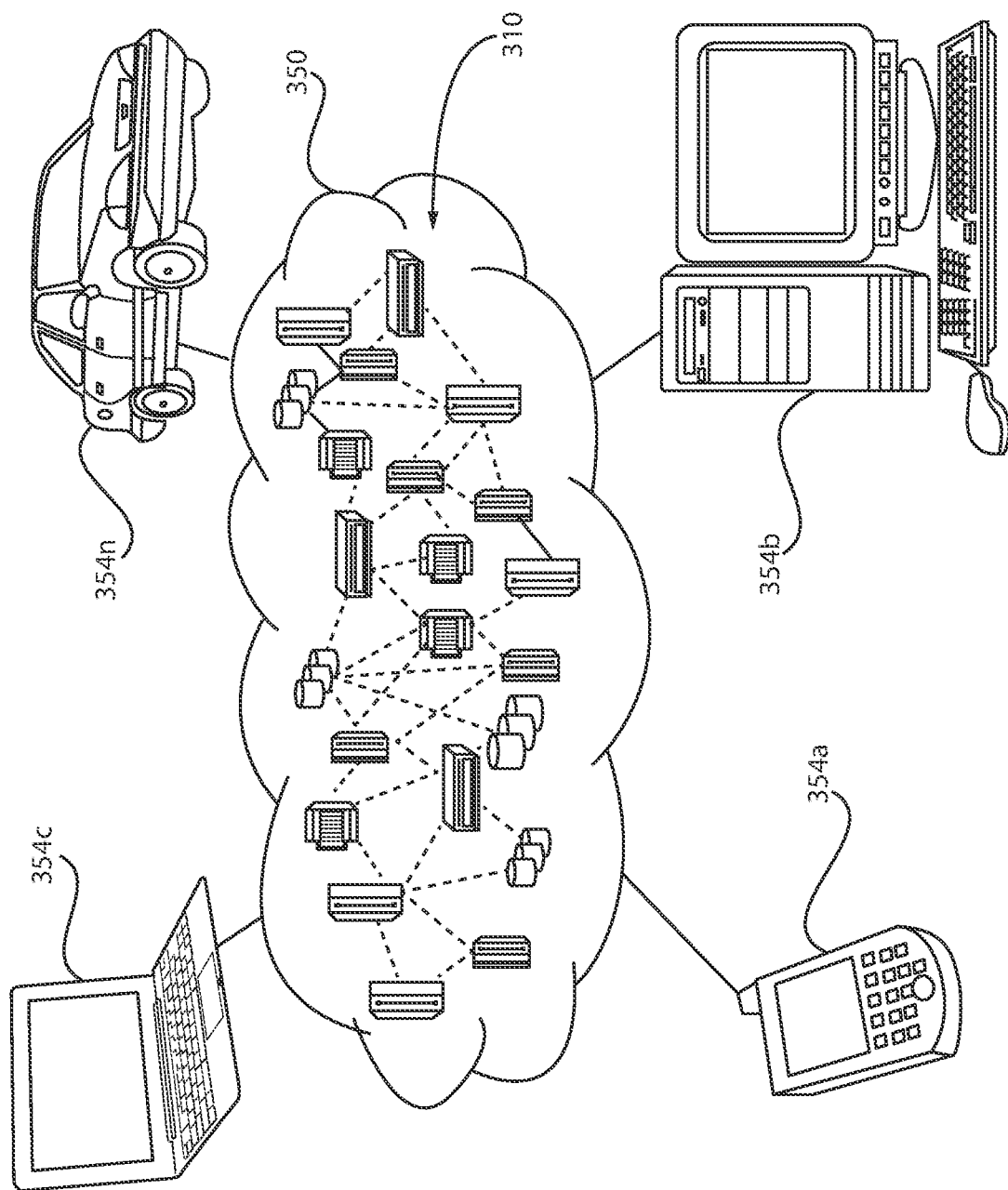
FIG. 8 is a block/flow diagram of an exemplary cloud computing environment, in accordance with an embodiment of the present invention.

FIG. 8 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 350 is depicted for enabling use cases of the present invention. As shown, cloud computing environment 350 includes one or more cloud computing nodes 310 with which local computing devices used by cloud consumers, such as, for example, personal digital assistant (PDA) or cellular telephone 354A, desktop computer 354B, laptop computer 354C, and/or automobile computer system 354N can communicate. Nodes 310 can communicate with one another. They can be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 8 are intended to be illustrative only and that computing nodes 310 and cloud computing environment 350 can communicate with any type of computerized device over any type of network and/or network addressable connection (e.g., using a web browser).

Figure 9:
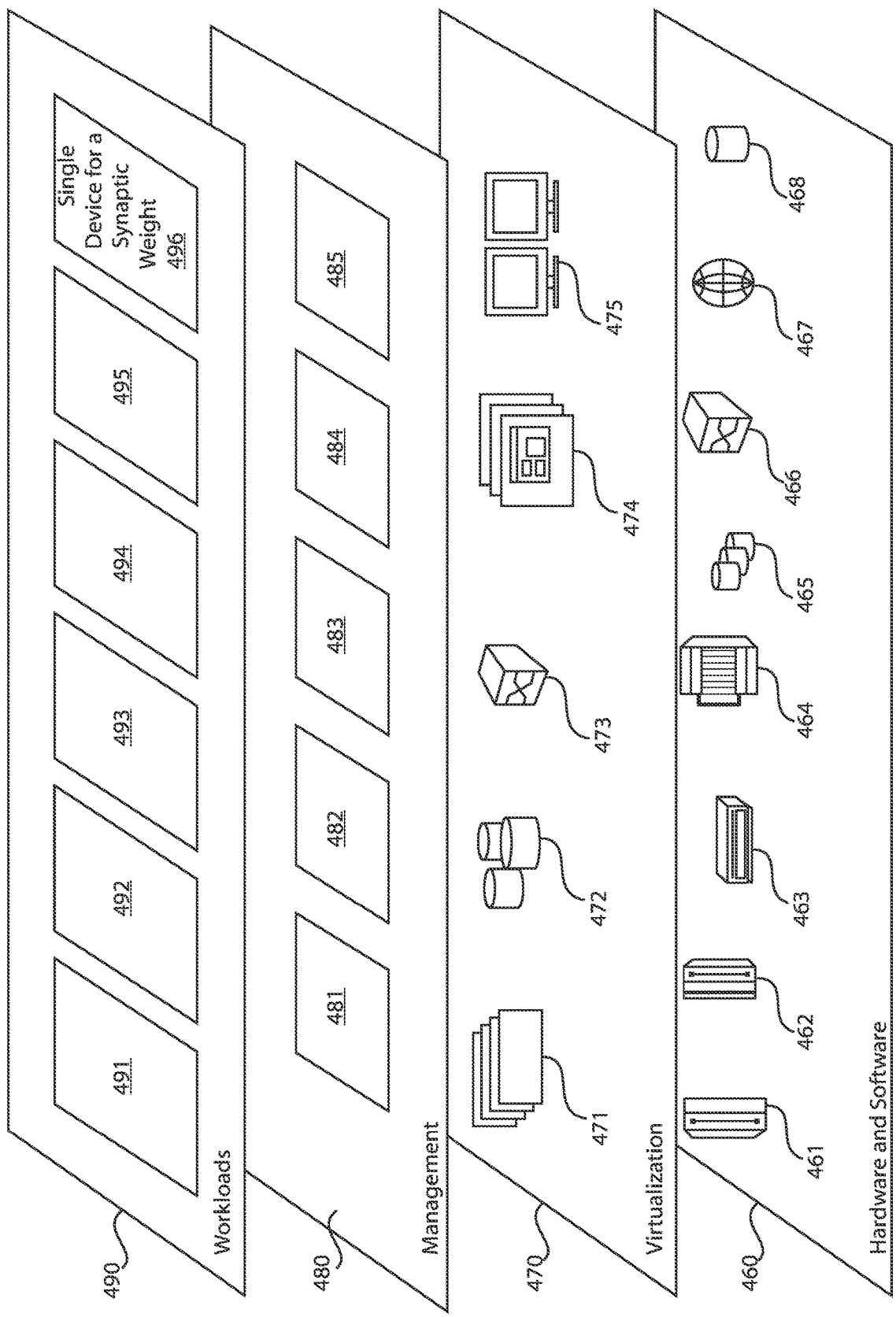
FIG. 9 is a schematic diagram of exemplary abstraction model layers, in accordance with an embodiment of the present invention.

FIG. 9 is a schematic diagram of exemplary abstraction model layers, in accordance with an embodiment of the present invention. It should be understood in advance that the components, layers, and functions shown in FIG. 9 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities can be provided: virtual servers 471; virtual storage 472; virtual networks 473, including virtual private networks; virtual applications and operating systems 474; and virtual clients 475.

In one example, management layer 480 can provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment can be utilized. Examples of workloads and functions which can be provided from this layer include: mapping and navigation 441; software development and lifecycle management 492; virtual classroom education delivery 493; data analytics processing 494; transaction processing 495; and single device for a synaptic weight 496.

Figure 10:
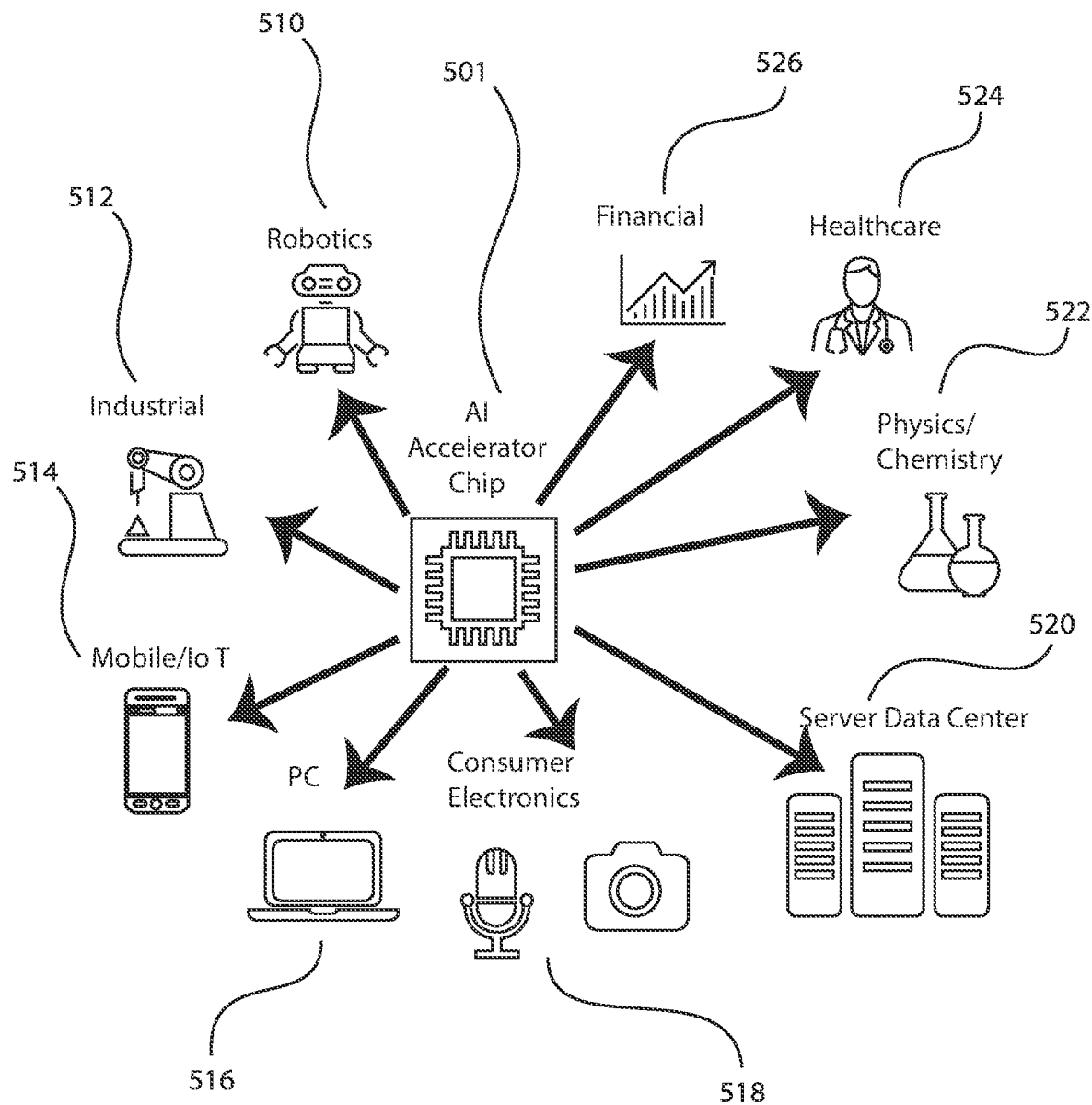
FIG. 10 illustrates practical applications for employing current mirrors for accelerating MAC operations, in accordance with an embodiment of the present invention.

FIG. 10 illustrates practical applications for employing current mirrors for accelerating MAC operations, in accordance with an embodiment of the present invention.

The artificial intelligence (AI) accelerator chip 501 can be used in a wide variety of practical applications, including, but not limited to, robotics 510, industrial applications 512, mobile or Internet-of-Things (IoT) 514, personal computing 516, consumer electronics 518, server data centers 520, physics and chemistry applications 522, healthcare applications 524, and financial applications 526. The AI accelerator chip 501 can employ the circuits in FIGS. 2-4 including the current mirrors and current integrators described.

For example, Robotic Process Automation or RPA 510 enables organizations to automate tasks, streamline processes, increase employee productivity, and ultimately deliver satisfying customer experiences. Through the use of RPA 510, a robot can perform high volume repetitive tasks, freeing the company's resources to work on higher value activities. An RPA Robot 510 emulates a person executing manual repetitive tasks, making decisions based on a defined set of rules, and integrating with existing applications. All of this while maintaining compliance, reducing errors, and improving customer experience and employee engagement. The AI accelerator chip 510 employing the circuitry of FIGS. 2-4 can enhance RPA 510.

Figure 11:
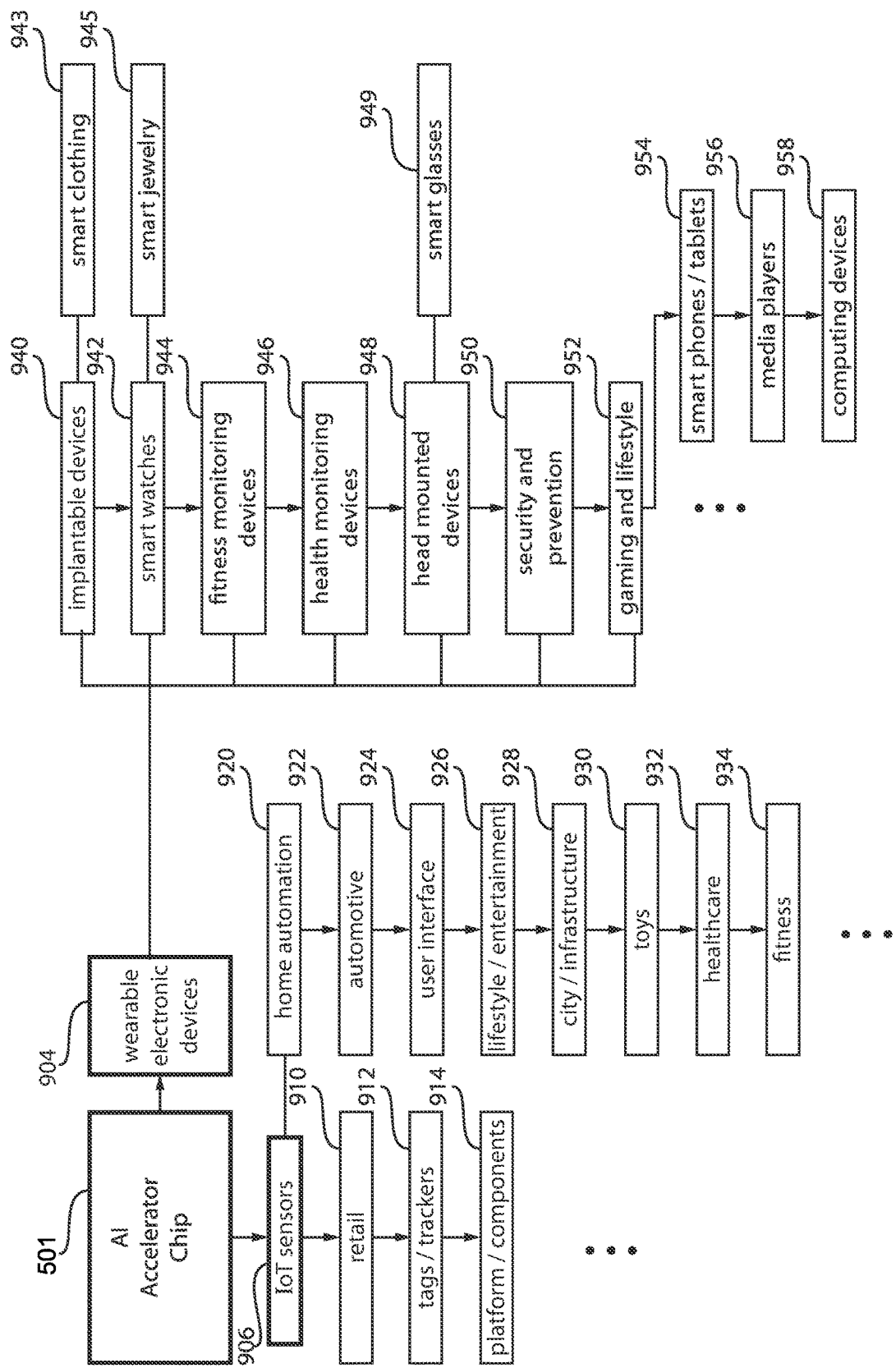
FIG. 11 is a block/flow diagram of a method for employing current mirrors for accelerating MAC operations with Internet of Things (IoT) systems/devices/infrastructure, in accordance with an embodiment of the present invention.

FIG. 11 is a block/flow diagram of a method for advantageously employing current mirrors for accelerating MAC operations with Internet of Things (IoT) systems/devices/infrastructure, in accordance with an embodiment of the present invention.

According to some embodiments of the invention, a network is implemented using an IoT methodology. For example, AI accelerator chip 501 can be incorporated, e.g., into wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The AI accelerator chip 501 described herein can be incorporated into any type of electronic devices for any type of use or application or operation.

IoT systems allow users to achieve deeper automation, analysis, and integration within a system. IoT improves the reach of these areas and their accuracy. IoT utilizes existing and emerging technology for sensing, networking, and robotics. Features of IoT include artificial intelligence, connectivity, sensors, active engagement, and small device use. In various embodiments, the AI accelerator chip 501 of the present invention can be incorporated into a variety of different devices and/or systems. For example, the AI accelerator chip 501 can be incorporated into wearable or portable electronic devices 904. Wearable/portable electronic devices 904 can include implantable devices 940, such as smart clothing 943. Wearable/portable devices 904 can include smart watches 942, as well as smart jewelry 945. Wearable/portable devices 904 can further include fitness monitoring devices 944, health and wellness monitoring devices 946, head-mounted devices 948 (e.g., smart glasses 949), security and prevention systems 950, gaming and lifestyle devices 952, smart phones/tablets 954, media players 956, and/or computers/computing devices 958.

The AI accelerator chip 501 of the present invention can be further incorporated into Internet of Thing (IoT) sensors 906 for various applications, such as home automation 920, automotive 922, user interface 924, lifestyle and/or entertainment 926, city and/or infrastructure 928, retail 910, tags and/or trackers 912, platform and components 914, toys 930, and/or healthcare 932, as well as fitness 934. The IoT sensors 906 can employ the AI accelerator chip 501. Of course, one skilled in the art can contemplate incorporating such AI accelerator chip 501 into any type of electronic devices for any types of applications, not limited to the ones described herein.

Figure 12:
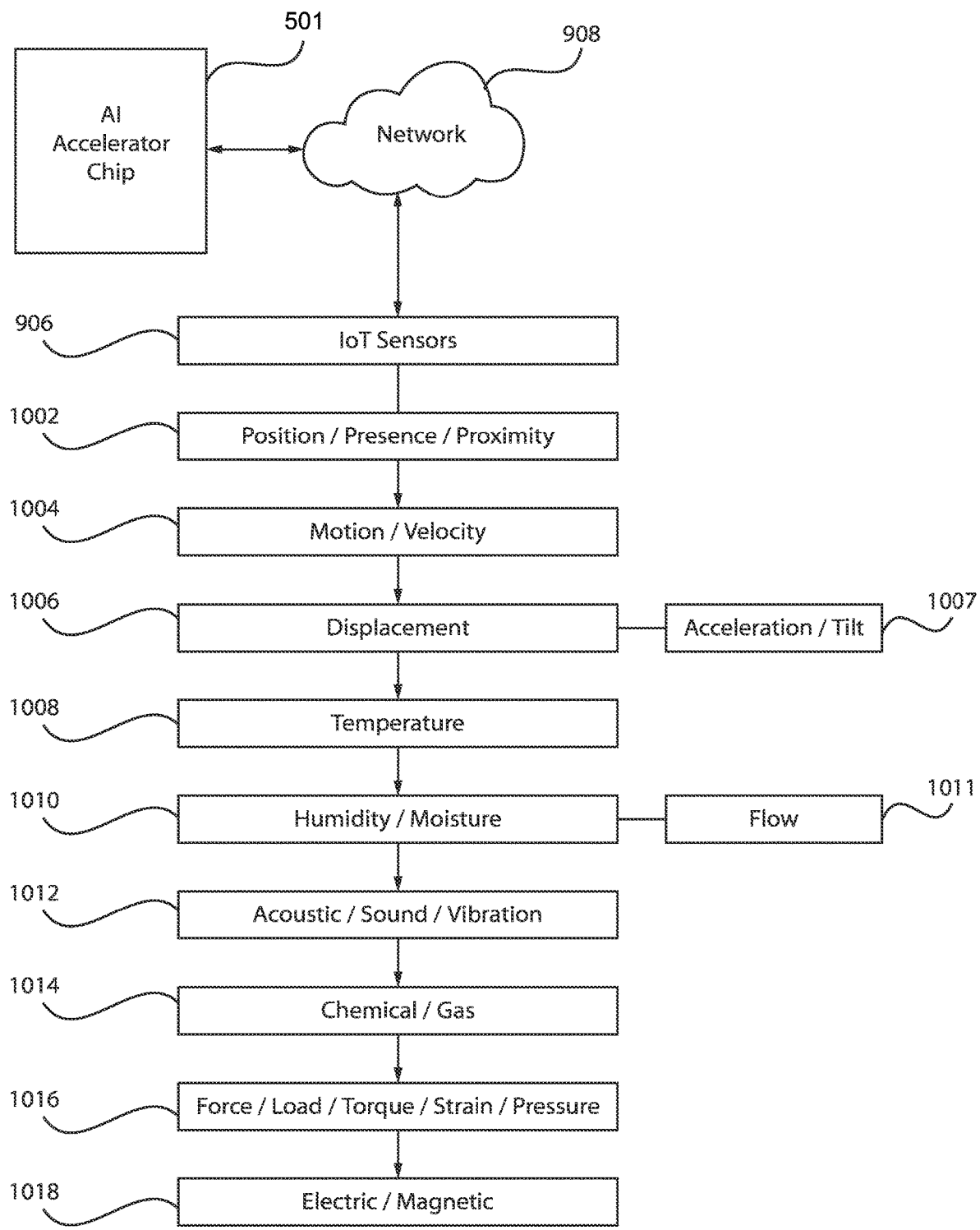
FIG. 12 is a block/flow diagram of exemplary IoT sensors used to collect data/information related to the current mirrors for accelerating MAC operations, in accordance with an embodiment of the present invention.

FIG. 12 is a block/flow diagram of exemplary IoT sensors used to advantageously collect data/information related to the current mirrors for accelerating MAC operations, in accordance with an embodiment of the present invention.

IoT loses its distinction without sensors. IoT sensors act as defining instruments which transform IoT from a standard passive network of devices into an active system capable of real-world integration.

The IoT sensors 906 can employ the AI accelerator chip 501 to transmit information or data, continuously and in in real-time, via a network 908, to any type of distributed system. Exemplary IoT sensors 906 can include, but are not limited to, position/presence/proximity sensors 1002, motion/velocity sensors 1004, displacement sensors 1006, such as acceleration/tilt sensors 1007, temperature sensors 1008, humidity/moisture sensors 1010, as well as flow sensors 1011, acoustic/sound/vibration sensors 1012, chemical/gas sensors 1014, force/load/torque/strain/pressure sensors 1016, and/or electric/magnetic sensors 1018. One skilled in the art can contemplate using any combination of such sensors to collect data/information of the distributed system for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a scalable and instantaneous bias scheme for a single-device synaptic element (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A neuromorphic synapse array comprising:
a plurality of synaptic array cells being connected by circuitry such that the synaptic array cells are assigned to rows and columns of an array, the synaptic array cells respectively having a single polarity synapse weight, the rows respectively connected to respective input ends of the synaptic array cells, the columns respectively connected to respective output ends of the synaptic array cells, the synaptic array cells aligned in a column of the array being defined as operation column arrays; and
an array of current mirrors, each current mirror exhibiting a mirror ratio of N:1, wherein N is a number of columns of the synaptic array cells, respectively connected to the respective rows such that weights corresponding to all of the current mirrors are set to average weights of all of the synaptic array cells that are updated during a learning phase.

2. The neuromorphic synapse array of claim 1, wherein at least a portion of the plurality of synaptic array cells includes a resistive memory.

3. The neuromorphic synapse array of claim 2, wherein at least a portion of the plurality of synaptic array cells includes a current integrator.

4. The neuromorphic synapse array of claim 3, wherein the array of current mirrors includes different current mirror configurations for one or more of the rows of the array.

5. The neuromorphic synapse array of claim 4, wherein one current mirror configuration includes two n-type field effect transistors (NFETs).

6. The neuromorphic synapse array of claim 4, wherein one current mirror configuration includes two p-type field effect transistors (PFETs) and a single NFET.

7. The neuromorphic synapse array of claim 4, wherein one current mirror configuration includes two NFETs and a single operational amplifier (op-amp).

8. The neuromorphic synapse array of claim 4, wherein one current mirror configuration includes two PFETs, a single NFET, and two op-amps.

9. The neuromorphic synapse array of claim 3, wherein the current integrator includes different configurations for one or more of the rows of the array.

10. The neuromorphic synapse array of claim 9, wherein one current integrator configuration includes two PFETs, a single NFET, and an integration capacitor.

11. The neuromorphic synapse array of claim 10, wherein the integration capacitor receives collected mirrored currents, copies the collected mirrored currents, and discharges the collected mirrored currents.

12. The neuromorphic synapse array of claim 9, wherein one current integrator configuration includes two PFETs, a single NFET, an op-amp, and an integration capacitor.

13. The neuromorphic synapse array of claim 12, wherein the integration capacitor receives collected mirrored currents, copies the collected mirrored currents, and discharges the collected mirrored currents.

14. The neuromorphic synapse array of claim 1, wherein the neuromorphic synapse array accelerates multiply-accumulate (MAC) operations in an artificial neural network accelerator chip.

15. A computer-implemented method comprising:
connecting, by circuitry, a plurality of synaptic array cells such that the synaptic array cells are assigned to rows and columns of an array, the synaptic array cells respectively having a single polarity synapse weight, the rows respectively connected to respective input ends of the synaptic array cells, the columns respectively connected to respective output ends of the synaptic array cells, the synaptic array cells aligned in a column of the array being defined as operation column arrays; and
connecting an array of current mirrors to the array, each current mirror exhibiting a mirror ratio of N:1, wherein N is a number of columns of the synaptic array cells, respectively connected to the respective rows such that weights corresponding to all of the current mirrors are set to average weights of all of the synaptic array cells that are updated during a learning phase.

16. The computer-implemented method of claim 15, wherein at least a portion of the plurality of synaptic array cells includes a resistive memory.

17. The computer-implemented method of claim 16, wherein at least a portion of the plurality of synaptic array cells includes a current integrator.

18. The computer-implemented method of claim 17, wherein the array of current mirrors includes different current mirror configurations for one or more of the rows of the array.

19. The computer-implemented method of claim 18, wherein one current mirror configuration includes two p-type field effect transistors (PFETs) and a single NFET.

20. The computer-implemented method of claim 18, wherein one current mirror configuration includes two NFETs and a single operational amplifier (op-amp).

21. The computer-implemented method of claim 18, wherein one current mirror configuration includes two PFETs, a single NFET, and two op-amps.

22. A neuromorphic synapse array comprising:
a plurality of synaptic array cells being connected by circuitry such that the synaptic array cells are assigned to rows and columns of an array, the synaptic array cells respectively having a single polarity synapse weight, the rows respectively connected to respective input ends of the synaptic array cells, the columns respectively connected to respective output ends of the synaptic array cells, the synaptic array cells aligned in a column of the array being defined as operation column arrays;
an array of current mirrors, each current mirror exhibiting a mirror ratio of N:1, wherein N is a number of columns of the synaptic array cells, respectively connected to the respective rows such that weights corresponding to all of the current mirrors are set to average weights of all of the synaptic array cells that are updated during a learning phase; and
an array of current integrators, each current integrator connected to a respective column of the array, and each current integrator including an integration capacitor to receive collected mirrored currents, copy the collected mirrored currents, and discharge the collected mirrored currents.

23. A computer-implemented method comprising:
connecting, by circuitry, a plurality of synaptic array cells such that the synaptic array cells are assigned to rows and columns of an array, the synaptic array cells respectively having a single polarity synapse weight, the rows respectively connected to respective input ends of the synaptic array cells, the columns respectively connected to respective output ends of the synaptic array cells, the synaptic array cells aligned in a column of the array being defined as operation column arrays;
connecting an array of current mirrors to the array, each current mirror exhibiting a mirror ratio of N:1, wherein N is a number of columns of the synaptic array cells, respectively connected to the respective rows such that weights corresponding to all of the current mirrors are set to average weights of all of the synaptic array cells that are updated during a learning phase; and
connecting an array of current integrators to the array, each current integrator connected to a respective column of the array, and each current integrator including an integration capacitor to receive collected mirrored currents, copy the collected mirrored currents, and discharge the collected mirrored currents.

24. A neuromorphic synapse array comprising:
a plurality of synaptic array cells electrically connected such that the synaptic array cells are assigned to rows and columns of an array, the synaptic array cells respectively having a single polarity synapse weight;
an array of current mirrors, each current mirror exhibiting a mirror ratio of N:1, wherein N is a number of columns of the synaptic array cells, respectively connected to the respective rows such that weights corresponding to all of the current mirrors are set to average weights of all of the synaptic array cells that are updated during a learning phase; and
an array of current integrators, each current integrator connected to a respective column of the array, and each current integrator including an integration capacitor to receive collected mirrored currents, copy the collected mirrored currents, and discharge the collected mirrored currents to accelerate multiply-accumulate (MAC) operations in an artificial neural network accelerator chip.

25. The neuromorphic synapse array of claim 24, wherein the array of current mirrors includes different current mirror configurations for one or more of the rows of the array.

* * * * *